H. ZACHGO.
Domestic Boiler.
No. 91,697. Patented June 22, 1869.
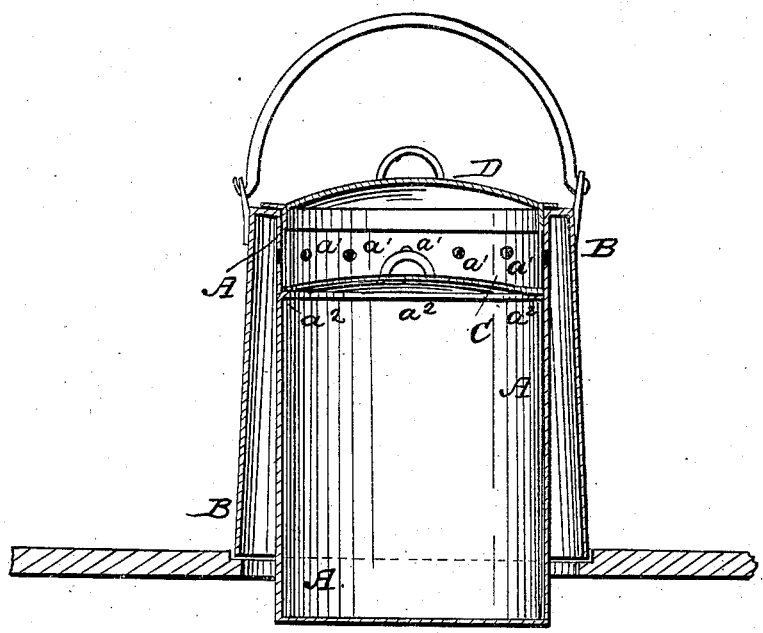
Witnesses
Inventor
H. Zachgo
PER

United States Patent Office.

HENRI ZACHGO, OF SOUTH BROOKLYN, NEW YORK.

Letters Patent No. 91,697, dated June 22, 1869.

CULINARY VESSEL.

The Schedule referred to in these Letters Patent and making part of the same.

*To all whom it may concern:*

Be it known that I, HENRI ZACHGO, of South Brooklyn, in the county of Kings, and State of New York, have invented a new and useful Improvement in Culinary Vessels; and I do hereby declare that the following is a full, clear, and exact description thereof, which will enable others skilled in the art to make and use the same, reference being had to the accompanying drawing, forming part of this specification.

The figure is a vertical longitudinal section of my improved vessel.

My invention has for its object to improve the construction of that class of culinary boilers in which the fumes arising from the articles being cooked are carried directly to the fire, without being discharged into the room; and The invention consists in constructing the vessel of two inner and outer walls, the former being of greater length than the latter, arranged in such a manner that an annular space shall be formed between them, opening directly into the fire through the boiler-hole of the stove. The lower edges of these walls are separate, having no connection with each other to obstruct the passage of the fumes from the inner vessel. The walls are connected at their upper ends, and at this point are closed by a suitable cover. The inner vessel is also provided with a cover, and between these two covers the walls of the inner vessel are perforated, to permit the passage of the fumes arising from said vessel to escape readily into the annular passage.

By this construction, no offensive odors are permitted to pass above the upper cover and escape into the room, but are discharged in the simplest manner directly into the stove.

A is the body of the vessel, which is made cylindrical in form, and of such a size, that when placed in the boiler-hole of a stove or range, a space may be left all around it, between it and the top plate of said stove or range.

B is the outer wall of the boiler, which is made a little shorter than the body A, and of such a size that its lower edge may fit into the boiler-hole of the stove or range, so as to rest upon the shoulder of said boiler-hole, as shown in red in the figure.

The body, or wall B inclines inward, so that its upper edge may meet or nearly meet the upper edge of the interior wall, or body A, with which it is securely connected.

When the vessel is made of cast-metal, the two parts A and B may be cast solid in one piece.

Through the interior wall A, near its upper edge, are formed numerous holes, $a'$, through which the steam developed in the process of cooking may pass into the space between the walls A and B, and passing down through said space, may pass off with the products of combustion, so that it will be impossible for any steam or any odor from the substance being cooked to escape into the room.

Upon the inner side of the inner wall A, a little below the openings $a'$, is formed a ledge, or shoulder, $a^2$, upon which may rest an inner cover, C, as shown in the figure.

The mouth of the vessel is covered with a cover, D, in the ordinary manner.

Having thus described my invention,

What I claim as new, and desire to secure by Letters Patent, is—

The culinary vessel constructed as described, of the double walls A B, of different lengths, separate at their lower edges and connected together at their upper edges, the lower part of the annular space between said walls opening directly into the fire, and the upper part communicating with the upper part of the interior vessel, by means of the openings $a'$, formed in the inner wall A, between the covers C D, all arranged as herein shown and described, for the purpose specified.

The above specification of my invention signed by me, this 1st day of April, 1869.

HENRI ZACHGO.

Witnesses:
 FRANK BLOCKLEY,
 JAMES T. GRAHAM.